United States Patent [19]

Tokuda

[11] Patent Number: 4,931,863
[45] Date of Patent: Jun. 5, 1990

[54] ELECTRONIC PHOTOGRAPHIC PRINTER/ENLARGER

[75] Inventor: Kanji Tokuda, Kanagawa, Japan

[73] Assignee: Fuji Photo Film Co., Ltd., Kanagawa, Japan

[21] Appl. No.: 226,908

[22] Filed: Aug. 1, 1988

[30] Foreign Application Priority Data

Jul. 31, 1987 [JP] Japan .................................. 62-191683

[51] Int. Cl.⁵ .................. H04N 1/23; H04N 1/393; H04N 1/46
[52] U.S. Cl. ........................................ 358/78; 358/80; 355/55; 355/64
[58] Field of Search .................. 358/54, 75, 76, 77, 358/78, 80, 287, 244, 335; 355/20, 32, 55, 64; 360/33.1, 35.1

[56] References Cited

U.S. PATENT DOCUMENTS

| | | | |
|---|---|---|---|
| 3,934,081 | 1/1976 | Schumacher | 178/6.8 |
| 4,326,217 | 4/1982 | Iwasawa et al. | 358/76 |
| 4,340,905 | 7/1982 | Balding | 358/80 |
| 4,641,198 | 2/1987 | Ohta et al. | 358/285 |
| 4,693,591 | 9/1987 | Saijo et al. | 355/41 |
| 4,712,909 | 12/1987 | Oshikoshi | 355/20 |
| 4,742,375 | 5/1988 | Kogane et al. | 355/20 |
| 4,764,807 | 8/1988 | Kimura et al. | 358/75 |
| 4,769,694 | 9/1988 | Oshikoshi | 358/75 |
| 4,777,515 | 10/1988 | Aikoh et al. | 355/64 |
| 4,786,944 | 11/1988 | Sakamoto et al. | 355/20 |
| 4,849,809 | 7/1989 | Tahara et al. | 358/75 |

FOREIGN PATENT DOCUMENTS

| | | |
|---|---|---|
| 294622 | 12/1988 | European Pat. Off. |
| 58-122529 | 7/1983 | Japan |
| 39970 | 2/1987 | Japan |

*Primary Examiner*—James J. Groody
*Assistant Examiner*—Robert M. Bauer
*Attorney, Agent, or Firm*—Sughrue, Mion, Zinn, Macpeak & Seas

[57] ABSTRACT

A photographic printer has a image taking means such as a color TV camera which takes an image of each picture of a roll of film which includes different sizes of pictures such as 35 mm full-size and 35 mm half-size picture frames to provide image signals, and a memory for storing the image signals. The image signals are read from the memory and displayed as a negative image in the form of a brightness pattern on a display such as CRT. Image signals for a half-size picture are read out from the memory in a direction perpendicular to that in which image signals of a full-size picture are read out, and interpolated so as to display a negative image magnified as large as an image of a full-size picture.

8 Claims, 3 Drawing Sheets

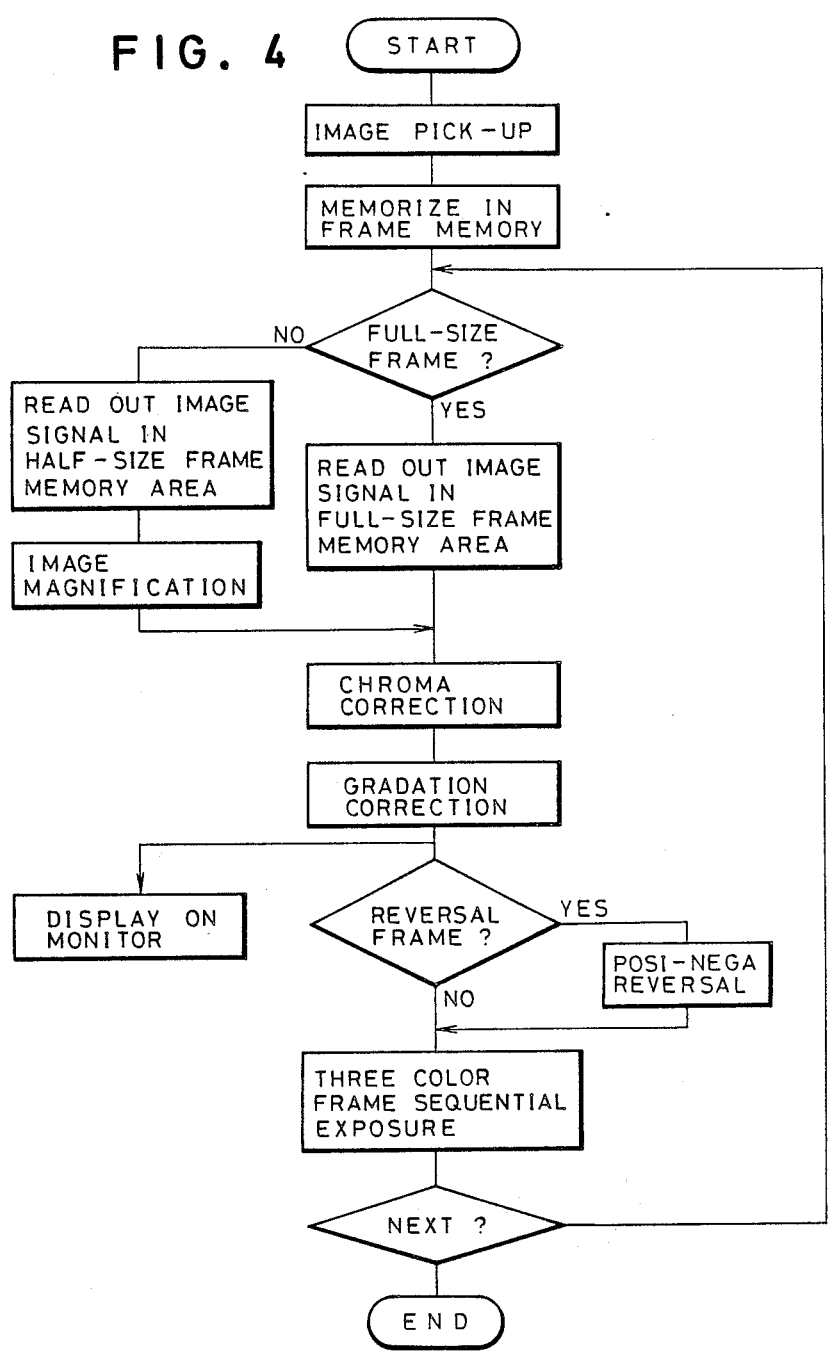

4,931,863

ELECTRONIC PHOTOGRAPHIC PRINTER/ENLARGER

BACKGROUND OF THE INVENTION

The present invention relates to a photographic printer and more particularly to a photographic printer which is suitable for making prints from a roll of film having intermixed negatives of full-size and half-size pictures thereon.

In commercial photo-finishing laboratories, a large number of rolls of film are connected to one another forming a single long film web to enable bulk processing. Since rolls of 35 mm-size film are provided in two formats or sizes, namely full-size or half size pictures, the single long film web made of multiple rolls of 35 mm film often includes pictures of both formats or sizes.

Conventionally, photographic printers are provided with means for reading data such as the type and format of the film or the film size, which are recorded on a tape when prints are made. Utilizing this data a photographic printer is controlled to change various printing factors such as the printing lenses, exposures, sizes of a framing mask and so forth.

One drawback that occurs in association with such photographic printers is that various mechanisms are required to change from printing of one size of picture to printing of different size pictures, for example full-size and half-size pictures.

OBJECT OF THE INVENTION

It is therefore, an object of the present invention to provide a photographic printer in which the printing size can be easily changed between full-size and half-size pictures.

SUMMARY OF THE INVENTION

In order to achieve the above and other objects, the photographic printer according to the present invention comprises means for taking an image of a picture on a roll of film, memory means for storing positive image signals of the picture provided by the image taking means, means for entering instructions concerning the size of the picture, means for reading an image signal out from the memory means in a first direction for a full-size picture and in a direction perpendicular to the first direction for half-size pictures, magnifying means for transforming the image signals of a half-size picture to produce an image two times as large as the original half-size picture, means for transforming the magnified image into a negative image, and printing means for printing the negative image on a photographic material.

Each image recorded on a roll of film is picked up by the image taking means and stored as an image signal in the memory means. The image signals will be stored in the memory in areas allotted to either full-size pictures or half-size pictures depending upon the size or format of the picture on the film web, and are read out either in a designated first direction for full-size pictures or in a direction perpendicular to the designated direction for half-size pictures. The image signals of a half-size picture are interpolated in order to magnify the image to two times its original size. In other words, the half-size image is magnified so that it is as large as a full-size picture image. The full-size picture image or the half-size picture image is displayed as a negative image on the display means, and is then printed on photographic paper by means of the printing means.

BRIEF DESCRIPTION OF THE DRAWINGS

FIG. 4 is a flow chart showing a sequential operation of the photographic printer of FIG. 1.

DETAILED DESCRIPTION OF THE INVENTION

Figure 1:
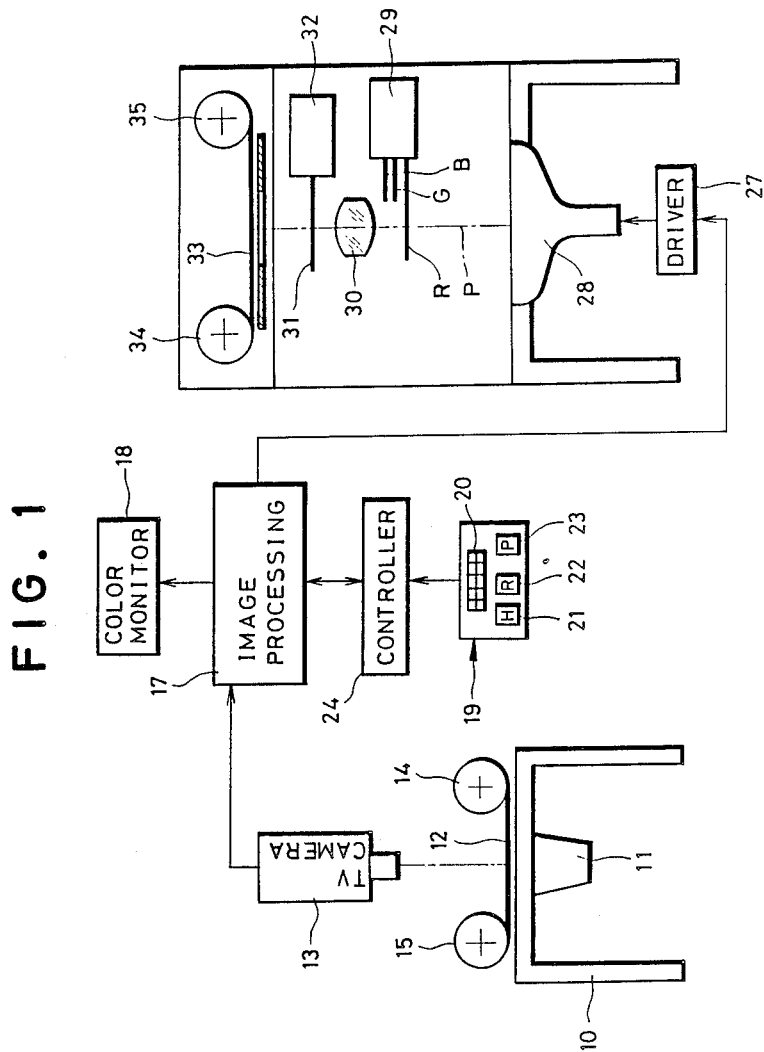
FIG. 1 is a schematic illustration showing a photographic printer according to a preferred embodiment of the present invention.

Referring now to FIG. 1, the photographic printer according to the present invention includes an image taking table 10 having a lamp house 11 attached to the bottom thereof. Inside the lamp house 11 are provided a light source for emitting white light, a light regulation filter or filters, and a mirror box for controlling the quality of illuminating light emitted therefrom.

A long film web 12, which can comprise multiple rolls of 35 mm film including 35 mm full-size negative picture film, 35 mm half-size negative picture film and 35 mm reversal film connected to one another, is placed in position on table 10. A color TV camera 13 takes a picture of a picture frame on the long film web 12 when it is at a position on table 10 such that the picture frame is illuminated with white light emitted by the light source in the lamp house 11. The long film web 12 is provided from a supply reel 14 and is advanced a picture frame at a time every time the color TV camera takes a picture, and is then wound up on a take-up reel 15.

The color TV camera 13 provides image signals for each picture frame of the long film web 12, and those signals are sent to an image processing section 17 of the photographic printer. In the image processing section 17, correction of chroma and/or gradation is performed for each picture frame in a well known manner. Furthermore, in the image processing section 17, an image of a 35 mm half-size picture can be rotated 90° or magnified, or positive images of a reversal film can be transformed into negative images. Processing of each image is continuously monitored on a color monitor device 18. The image processing section 17 is controlled by controller 24 having a programmed operation sequence. A keyboard 19 is connected to the controller 24. The keyboard 19 is provided with correction keys 20 for chroma and gradation corrections, a half-size key 21 for indicating that an image to be printed is of a half-size type picture, a reversal key 22 for indicating that an image to be printed is of a reversal picture, and a print key 23 for starting the printing operation.

The image signals processed in the image processing section 17 are sent to a black-and-white CRT 28 through a CRT driver 27 and are displayed as a black-and-white image in the form of a brightness pattern for three colors, namely red, green and blue. In order to change each black-and-white image into a corresponding color image, a color filter is provided for each color, namely a red filter (R), a green filter (G) and a blue filter (B). Each color filter is controlled by a filter controller 29 so that it can be inserted into a printing path P independently of the other two filters.

A shutter 31 is provided above the black-and-white CRT 28 and is controlled by a shutter controller 32 to open and close once for each color, and thus three times in total for each picture. Because the black-and-white CRT 28 is used in order to improve image definition, the shutter is intermittently opened and closed three times in order to print a color image on photographic paper 33 by means of a printing lens 30 disposed between the black-and-white CRT 28 and the shutter 31. If it is more desirable to use a color CRT, the shutter need only be opened and closed once for each picture in order to print the video image displayed on the color CRT onto the color photographic paper 33. The color photographic paper 33 is drawn from supply reel 34 one picture frame at a time, and is taken up by take-up reel 35 every time an image of a picture is printed thereon. The present invention is also capable of printing a black-and-white image on black-and-white photographic paper.

Figure 2:
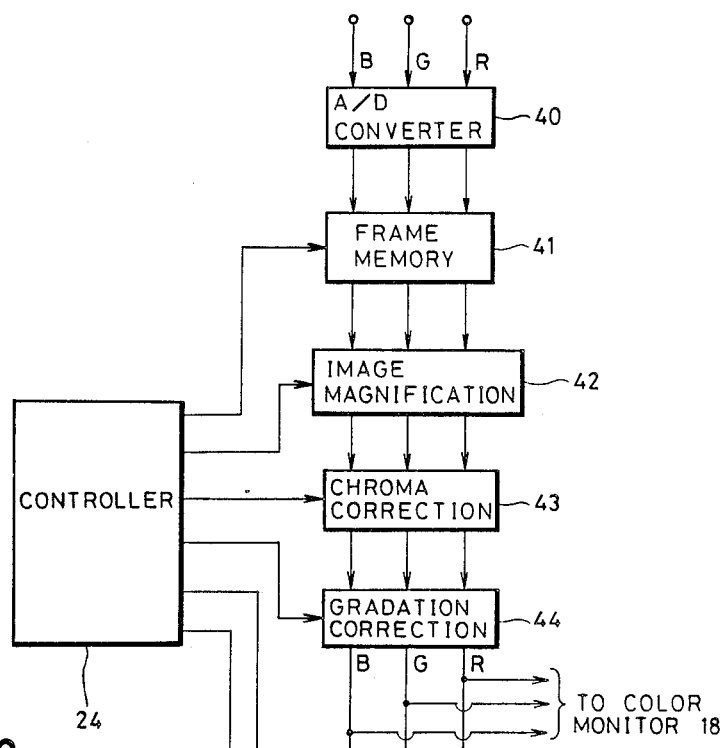
FIG. 2 is a block diagram showing an image processing section incorporated in the photographic printer of FIG. 1.
Figure 3:
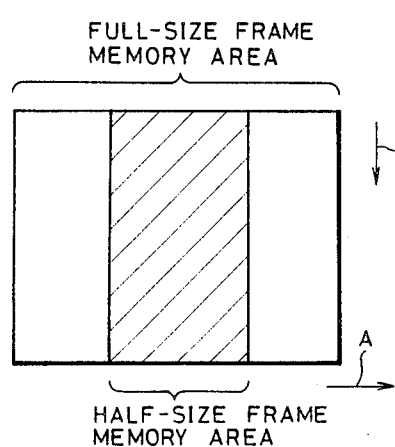
FIG. 3 is an illustration of a memory location of a memory means in the image processing section of FIG. 2.

The image processing section 17 is constructed as is shown in FIG. 2. As shown in FIG. 2, image signals B, G and R provided by the color TV camera 13 for each color are converted into digital form by an A/D converter 40 and then stored separately in frame memory 41 by color. As shown in FIG. 3, the frame memory 41 is read in a direction shown by an arrow A to read out image signals of a full-size picture or in a direction shown by an arrow B to read out image signals of a half-size picture. The shaded area shows a memory area for image signals for a half-size picture. Since the direction in which image signals of a half-size picture are read out is perpendicular to that in which image signals of a full-size picture are read out, an image on a 35 mm half-size picture film can easily be rotated 90° relative to an image on a 35 mm full-size frame film.

The image signals of each color read out from the frame memory 41 are sent to an image magnification section 42, from which image signals are transmitted to a chroma correction section 43 without performing any magnification when the image signals are for a full-size picture or after interpolation for a 2× image magnification when the image signals are for a half-size picture. Then, the chroma of each of the image signals is corrected by operating a 3×3 matrix formula in the chroma correction section 43. The chroma corrected image signals are subjected to gradation correction in a gradation correction section 44 which comprises, for example, look-up table memories. For gradation correction, the image signals are transformed using linear table data. The three color image signals are sent to the color monitor 18, while simultaneously being selectively transmitted by a selector 45 to another selector 46 directly when the three color image signals are of a negative film or through a reversal circuit 47 when the three color image signals are of a reversal film. The reversal circuit 47, which comprises, for example, a look-up table memory, reverses positive image signals into negative image signals. The selector 46 selectively transmits the three color image signals one color at a time to the CRT driver 27 to display each color of image signals as a black-and-white image in the form of a brightness pattern on the black-and-white CRT 28.

Referring now to FIGS. 2 and 4 the operation of the photographic printer shown in FIG. 1 will be explained. Before taking an image of a picture on the long film web 12 via the color TV camera 13, the type and format of film of the picture is determined. If the picture is a half-size picture on reversal film, image magnification, chroma correction, gradation correction are performed and image reversal are performed when the half-size key 21 and the reversal key 22 are depressed.

The color TV camera 13 is operated to pick up an image of the illuminated picture and to provide the image processing section 17 with image signals of the picture as separate colors. After being subjected to an analog-to-digital conversion, the image signals are written in the half-size memory area of the frame memory 41. Thereafter, the image signals are read out from the frame memory 41 in the direction of the arrow B and processed for 2× magnification in the image size magnifying section 42. The magnified image signals are subjected to a chroma correction in the chroma correction section 43 and to a gradation correction in the gradation correction section 44. Thereafter, the image signals are transmitted to the color monitor 18, after having been transformed into positive image signals if necessary, so as to display a positive image on the color monitor 18 for visual inspection. If, as a result of the visual inspection it is determined that a printed image will be of poor quality, in particular with regard to chroma and/or gradation, the correction keys 20 are used to enter correcting values. Thus, the chroma, color balance, density and contrast of the image displayed on the color monitor 18 may be corrected. It should be understood by those skilled in the art that color balance and density can be corrected by changing the exposure time for each color.

When the corrected image displayed on the color monitor 18 is acceptable, the print key 23 is depressed to effect a three color frame sequential exposure. In more detail, if the picture is a negative, the image signals for one color, for example red, are selected by the selector 46 and sent to the CRT driver 27 so as to display the red image signals as a black-and-white negative image in the form of a brightness pattern on the black-and-white CRT 28. While the black-and-white image for red is displayed on the black-and-white CRT 28, the red filter (R) is inserted into the printing path P to transform the black-and-white image into a corresponding red image and the color photographic paper 33 is exposed to the red image projected thereto through the printing lens 30 by opening the shutter for an exposure period, which depends on the light sensitivity of the color photographic paper 33 to red.

After the exposure of the red image, the shutter 31 is closed and the red filter (R) is replaced with the green filter (G) in the printing path P. Simultaneously, the green image signals are displayed as a black-and-white image in the form of a brightness pattern on the black-and-white CRT 28. Then, the shutter 31 is opened again so as to expose the color photographic paper 33 to a green image in the same way as for the red image. Likewise, the color photographic paper 33 is exposed to a blue image in the same way as for the red and green images, thereby completing a three color frame sequential exposure for a video image of the picture. Thereafter, the color photographic paper 33 is transported by one frame so that an unexposed part of the color photographic paper 33 is placed in the exposure position.

For reversal films, the same printing sequence is effected as for negative films except that negative image signals are transformed into positive image signals in the reversal circuit 47 and selectively transmitted by color to the CRT driver 27 by selector 46.

In this embodiment of the invention, although a color TV camera having a camera tube or a color image area sensor is used, a scanner having a color image line sensor may be used as an image taking means. Furthermore, a liquid crystal display or a plasma display can be used instead of the CRT.

Although the present invention has been described by way of preferred embodiment with reference to the accompanying drawings, various changes and modifications will be apparent to those skilled in the art. Therefore, unless such changes and modifications depart from the scope of the present invention as defined by the appended claims, they should be construed as included therein.

What is claimed is:

1. A photographic printer for making prints from pictures of different sizes of a photographic film, said photographic printer comprising:

means for taking an image of each picture of a roll of photographic film to provide image signals;

memory means for storing said image signals in different memory areas according to said different picture sizes;

means for processing said image signals for said half-size pictures read out of said memory means so as to display images magnified to be as large as images of said full-size pictures, said means for processing including means for interpolating said image signals for said half-size pictures so as to produce said magnified images;

read out means for reading out said image signals for each picture from said memory means;

display means for displaying said image signals as a negative image thereon; and printing means for printing said negative image displayed on said display means on a photographic material.

2. A photographic printer as defined in claim 1, wherein said pictures of different sizes are half-size pictures and full-size pictures.

3. A photographic printer as defined in claim 2, wherein said read out means reads out said image signals for a half-size picture in a direction rotated 90° with respect to a direction in which said image signals for said full-size pictures are read out.

4. A photographic printer as defined in claim 1, wherein said image taking means is a color TV camera.

5. A photographic printer as defined in claim 4, wherein said display means is a CRT.

6. A photographic printer as defined in claim 5, wherein said CRT display is a black-and-white CRT which sequentially displays said image signals for three primary colors as a black-and-white image in the form of a brightness pattern, each of said black-and-white images being transformed to a corresponding colored image by means of a corresponding color filter upon being printed on said photographic material.

7. A photographic printer as defined in claim 1, wherein said means for processing further comprises:

chroma correcting means for correcting the chroma of said negative image displayed by said display means; and gradation correcting means for correcting the gradation of said negative image displayed by said display means.

8. A photographic printer as defined in claim 1, further comprising means for reversing said image displayed on said display means when one of said pictures on said photographic film is a reversed picture and not a negative picture.

* * * * *